United States Patent

Broser

[15] 3,687,275
[45] Aug. 29, 1972

[54] AUTOMATIC ACCUMULATING WORK PIECE LIFT AND CARRY TRANSFER MECHANISM

[72] Inventor: Richard Broser, Royal Oak, Mich.

[73] Assignee: Accum-Matic Systems, Inc., Livonia, Mich.

[22] Filed: Nov. 23, 1970

[21] Appl. No.: 91,837

[52] U.S. Cl. ............................................. 198/219
[51] Int. Cl. ........................................... B65g 25/04
[58] Field of Search ........................ 198/219, 221, 19

[56] References Cited

UNITED STATES PATENTS

| | | | |
|---|---|---|---|
| 3,545,600 | 12/1970 | Rualaff | 198/221 |
| 3,385,418 | 5/1968 | Broser | 198/221 |

*Primary Examiner*—Richard E. Aegerter
*Attorney*—Cullen, Settle, Sloman & Cantor

[57] ABSTRACT

A mechanical automatic accumulating transfer machine for conveying work pieces which has a series of work piece supporting stations upon a frame, the latter movably mounting a lift and carry shuttle mounting a pair of parallel opposed longitudinal rows of lifting dogs pivoted automatically to an inoperative non-lifting position and in response to a mechanical sensing arm at each station pivoted to an operative work piece lifting position when said station is empty, and wherein opposed pairs of dogs are interconnected for movement in unison. Cam rollers on said dogs and in one row respond to a cam controlled by said sensing arm at an empty station to mechanically tip said dog to work piece lift position. Trip arms are arranged in pairs of rows on said shuttle, the arms being end to end, each connected to a lifting dog, so that when one dog is automatically pivoted to inoperative position, all dogs forwardly thereof are similarly tipped, and when one dog is tipped to operative position, all dogs rearwardly thereof are similarly tipped.

12 Claims, 4 Drawing Figures

PATENTED AUG 29 1972 3,687,275

INVENTOR
RICHARD BROSER
BY Cullen, Settle, Sloman & Cantor
ATTORNEYS

INVENTOR
RICHARD BROSER
Cullen, Settle, Sloman & Cantor
BY
ATTORNEYS

AUTOMATIC ACCUMULATING WORK PIECE LIFT AND CARRY TRANSFER MECHANISM

BACKGROUND OF THE INVENTION

In an automation line employing reciprocating work piece lift and carry transfer mechanism, in an automatic fashion from station to station, it is absolutely required, when all the stations are filled with a corresponding work piece, that the respective lifting dogs remain in inoperative clearance position in order to prevent an undesirable longitudinal feed movement of a work piece which is yet to be machined or worked upon.

BRIEF DESCRIPTION

It is an object of the present invention to provide an automatic accumulating lift and carry transfer mechanism for the movement of a series of work pieces along supporting rails by which the mechanism automatically senses the necessity for rendering the lifting dogs corresponding to a particular station operative for advancing the work pieces successively from one station to another.

It is an object to provide an automatic accumulating transfer mechanism by which the machine automatically senses necessity for rendering the corresponding lifting dogs operative for advancing the work pieces successively, simultaneously as desired from station to station in an automatic manner.

It is another object to maintain a full conveyor at all times keeping the respective work pieces moving as fast as possible from one station to the next succeeding station.

It is another object to incorporate means by which when a work piece may be removed from any station the remainder of the work pieces will continue to move in a steady flow from station to station filling up any empty stations and in a continuous manner.

It is still another object to incorporate means by which when a work piece has been removed from a particular station, the machine has a sensing mechanism which will permit all parts behind the space left by the removed work piece to be moved forward simultaneously in a steady flow while moving forwardly those parts ahead of the empty station.

It is another object to incorporate control mechanisms by which all of the respective pairs of lifting dogs are mechanically pivoted automatically to an inoperative position on retraction of the transfer mechanism wherein, it is not necessary for the lifting dogs to operatively engage the succeeding work pieces for tipping to inoperative position.

These and other objects will be seen from the following specification and claims in conjunction with the appended drawings.

THE DRAWINGS

DETAILED DESCRIPTION

Figure 1:
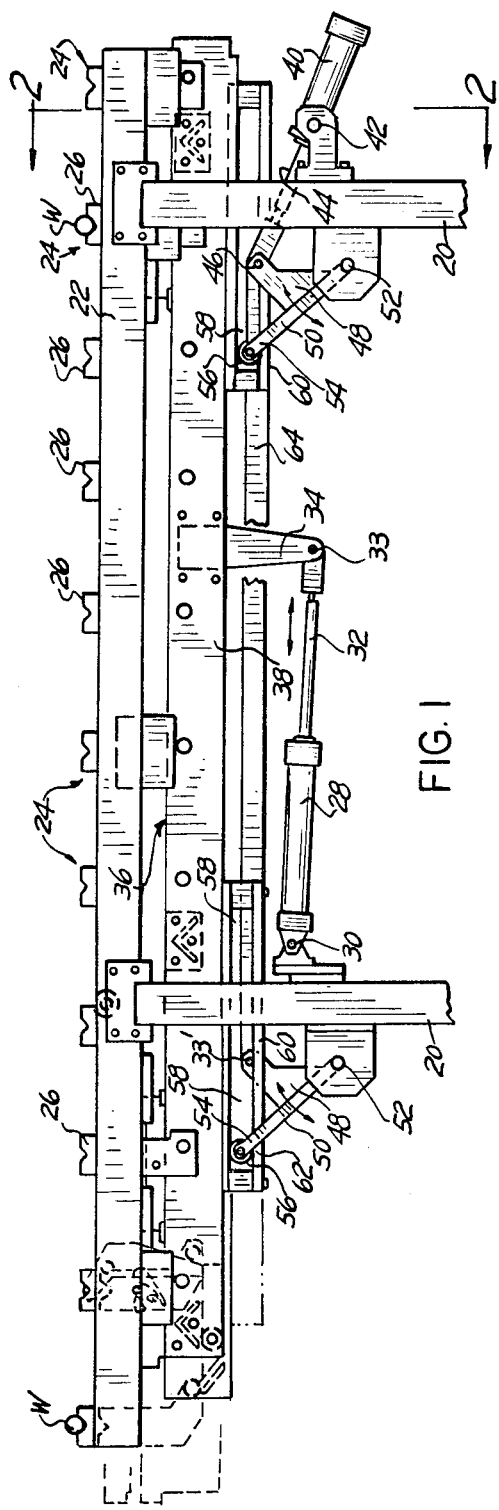
FIG. 1 is a fragmentary partly broken away side elevational view of the present accumulating lift and carry transfer machine.

Referring to the drawings, the present automatic accumulating left and carry transfer mechanism is an improvement in my copending patent application Ser. No. 584,445 of Oct. 5, 1966, now U.S. Pat. No. 3,557,943 dated Jan. 26, 1971 and comprises a frame 20 having upright members at the corners thereof and cross members connecting the uprights. A pair of longitudinally extending parallel top side plates 22 are mounted at the top of the frame, each side plate being attached to the upright members on that respective side of the frame. Said plates have a series of longitudinally extending uniformly spaced work receiving stations 24 on top thereof. Each work receiving station is aligned with the work receiving station on the opposite side. A series of spaced depressed work piece holders 26 are located at the respective work receiving stations.

A shuttle 36 is mounted on the frame for rectilinear movement underneath and inside the work receiving stations. Means for causing reciprocal alternating vertical and horizontal movements of the shuttle are provided.

Hydraulic cylinder 28 is pivotally mounted at 30 upon an under portion of frame 20 and includes reciprocal piston rod 32 which is pivotally connected at 33 to the depending arm 34 on the horizontally elongated shuttle 36. Said shuttle includes a pair of longitudinally extending parallel spaced upright transfer bars 38.

Lifting cylinder 40 is arranged substantially on the center line of the frame spaced from transfer cylinder 28, is pivoted at 42 upon said frame and includes reciprocal piston rod 44 pivoted at 46 to the cylinder arm 48. Said cylinder arm is in turn connected to lift arm 50, the latter pivotally mounted at its lower end 52 upon said frame, FIG. 1.

Figure 2:
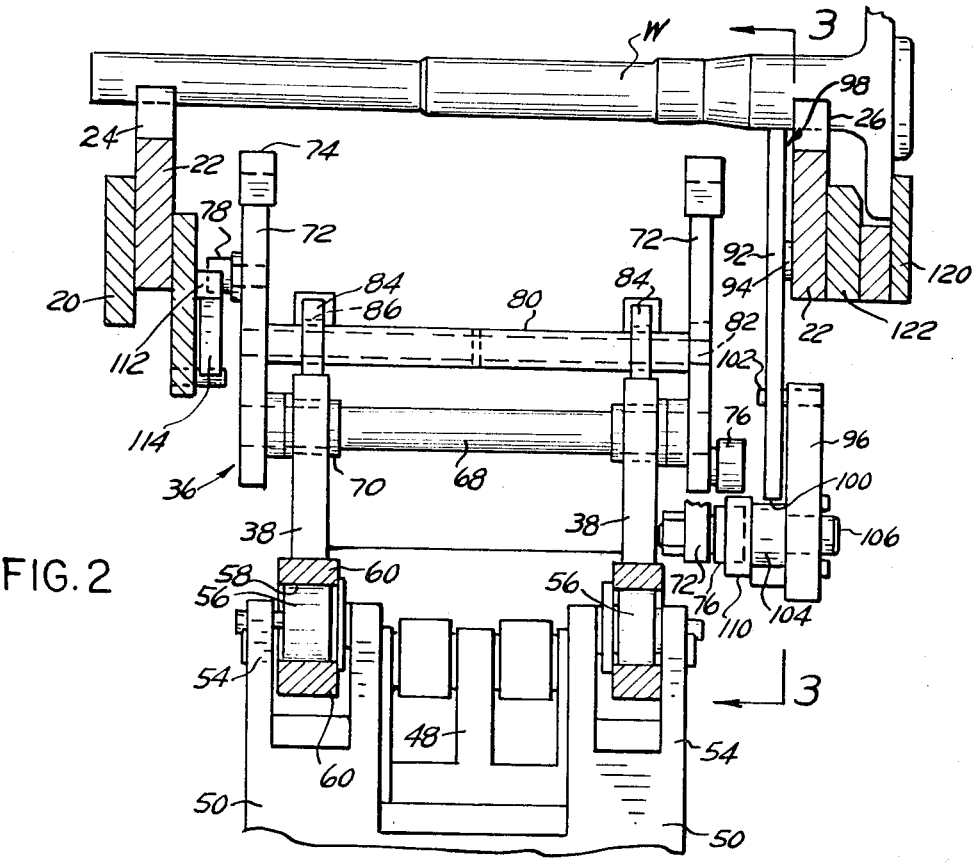
FIG. 2 is a fragmentary partly broken away right end elevational view thereof.
Figure 4:
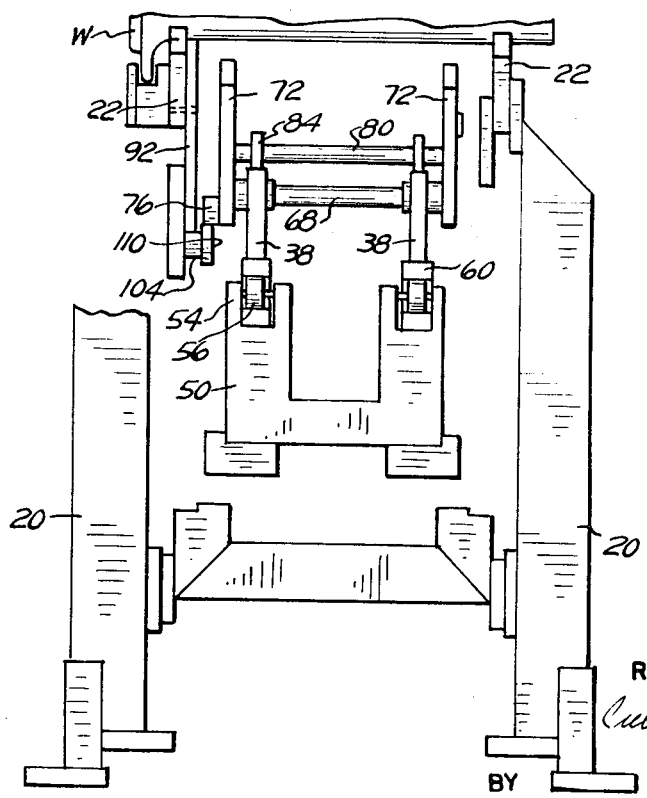
FIG. 4 is a fragmentary partly broken away left end elevational view of the transfer machine of FIG. 1.

Said lift arm at its upper end, FIGS. 2 and 4, includes a pair of clevices 54 which journal rollers 56 nested within the horizontally disposed cam slots 58 within the longitudinally spaced opposed pairs of lifting members 60 and 62, FIG. 1.

An elongated pull bar 64 at one end is pivotally connected at 46 to pivotal lift arm 50 and at its opposite end, is pivoted at 33 to a similar cylinder arm 48 connected to a second lift arm 50. This second lift arm is, likewise, pivotally mounted at its lower end as at 52 to a portion of said frame. And in a similar construction, includes at its upper end a pair of spaced clevices 54 which mount rollers 56 movably positioned within the corresponding cam slots 58 of the second pair of lifting members 62, FIG. 1.

This construction provides for a lift and carry type of shuttle mechanism wherein, there is provided reciprocal alternating vertical and horizontal movements.

By this construction, from the retracted position, the shuttle moves vertically upward, horizontally forward, vertically downward and horizontally rearward in a general clockwise direction in its lift and carry function.

A pair of parallel opposed longitudinal rows of lifting dogs 72 are pivotally mounted upon said shuttle for lifting work pieces W off of each of the work piece receiving stations 24, and 26 and carrying the same to the next forward station. The lifting dogs are arranged in pairs between the respective rows. For each pair of lifting dogs, there is provided a transversely arranged cross rod 68, FIG. 2 which extends through bearings 70 within the respective transfer bars 38 and which mount upon the respective ends the corresponding work piece lift and carry dogs 72.

These lifting dogs have depressed cradle elements 74 at their upper ends adapted to cooperatively receive portions of a transversely arranged work piece W. The lifting dogs have an upright operative lift and carry position, such as shown at A, FIG. 3, and are normally positioned in the forwardly inclined or tipped inoperative position designated at B, FIG. 3.

Each of the lifting dogs 72 in one of the longitudinal rows of dogs have a first cam roller 76 mounted on the lower outside end thereof. A second cam roller 78 is mounted on the outside upper middle of some of the lifting dogs 72 in the second opposed longitudinal row of dogs.

Figure 3:
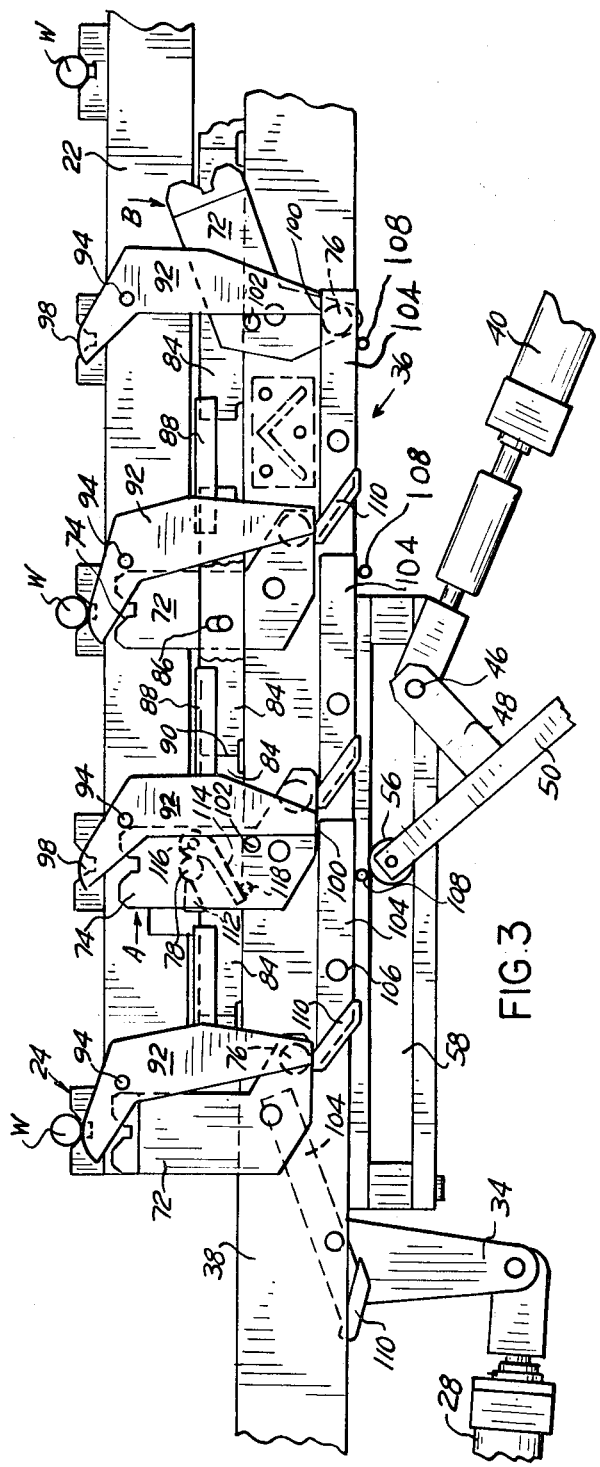
FIG. 3 is a fragmentary partially broken away longitudinal section taken in the direction of arrows 3—3 of FIG. 2.

Tie bar 80 is spaced above transfer bars 38 and extends between and is fixedly secured at 82 to the respective opposed pair of dogs 72 whereby, the dogs are capable of moving in unison between the normal inoperative position B, FIG. 3 to the upright operative position A.

The tie bar 80 for a particular pair of opposed dogs extends loosely through the vertically elongated slots 86 in an adjacent pair of elongated spacer bars 84 which slidably bear upon the respective transfer bars 38 with a corresponding pair of said trip arms loosely connected to each pair of dogs 72.

Accordingly, the spacer bars for the respective additional pairs of dogs are arranged in a pair of longitudinal rows end to end upon the respective transfer bars 38, as best shown in FIG. 3 as at the registry line 90. Elongated channel 88 is secured to the rear end of each spacer bar or trip arm and extends rearwardly therefrom so as to cooperatively guidably overlie the corresponding next succeeding trip arm for keeping the same in alignment.

It is noted in FIG. 3 that the slots 86 which receive the tie bar 80 are vertically elongated whereby, upon pivotal movements of the said dogs, the said spacer bar or trip arms are not lifted off the corresponding transfer bars 38. Furthermore, the said tie bars limit the pivotal movements of the said pairs of dogs between inoperative to operative positions.

A series of longitudinally aligned work piece detecting levers 92 are pivotally mounted at 94 upon the corresponding side plate 22 of the machine frame, best shown in FIG. 2 and arranged adjacent the row of dogs which mount the first cam rollers 76.

Each detecting lever has a projection 98 at its upper end whose upper surface extends into the space of the corresponding work piece receiving station 26, FIG. 3, and includes at its lower end the normally horizontal flat stop surface 100.

Stop pin 102, FIG. 2, limits gravity pivotal movement of each work piece detecting lever 92 to an upright operative position. Work piece W will tilt said lever to an inclined inoperative position.

A dog actuating lever 104 is pivotally mounted at 106 upon said frame underneath each of the corresponding work piece detecting levers 92 and includes on one side thereof the cam surface 110, FIGS. 2 and 3. Dog actuating lever 104 normally in the horizontal position shown in FIG. 3 is retained by the stop pin 108.

In the operation of the present lift and carry transfer mechanism as hereafter described, automatic means are provided by which as the lift and carry shuttle assembly begins its rearward traverse, all of the work piece engaging dogs are tipped to the inoperative dotted line position shown at B, FIG. 3. Towards the end of the rearward stroke of the shuttle, the said first roller 76, being in the lower dotted line position shown at B, FIG. 3, is engageable with the cam surface 110 for tilting the lifting dog to the upright operative solid line position shown at A, FIG. 3. Under this condition, it is noted that the detecting lever 92 is in its upright position, since it corresponds to an empty station, FIG. 3. Its lower flat end 100 retainingly engages cam lever 104 holding it in the position shown. Accordingly, its corresponding cam 110 is, thus, capable of tipping the lifting dog 72 to the upright operative work piece lifting position shown at A. This means that the additional opposed dog 72 connected with the first mentioned dog by the tie rod 80 is also lifted to the operative position shown. All rearward mounted dogs move into operative position through spacer bars or trip arms 84.

Means are provided, accordingly, for tilting and pivoting simultaneously all of the opposed pairs of lifting dogs from this operative upright position wherein, the lifting dogs will engage and lift a work piece W when the shuttle is lifted, to a second angled over normally inoperative position designated at B, FIG. 3. Here the lifting dogs will not engage a work piece when the shuttle is lifted.

To accomplish this, there are provided on some of the lifting dogs 72 of the second row of lifting dogs which is remote from the work piece detecting arms, a second cam roller 78. At the beginning of the retracting movement of the shuttle, said roller is retainingly engaged by an interference stop 112 which projects inwardly from a portion of the frame and functions in conjunction with a forwardly spaced cam detent 114 pivoted at 116 upon said frame and adapted to tip downwardly to the position defined by stop 118.

On the initial retraction and corresponding downward movement of the shuttle the said second cam roller 78 moves between the respective interference stop 112 and the cam guide 114 to thus, on continued retraction of the shuttle, cause the upright dogs 72 to move from position A to the position B shown in dotted lines. The cam 114 functions to smoothly and gradually guide the respective dogs 72 to this inoperative position.

By the present construction, normally speaking, the second cam roller 78 is arranged upon at least the rear most one of a set of dogs 72 with the result that as this opposed pair of dogs is tipped to inoperative position B, all of the pairs of dogs forwardly thereof will also be automatically tipped forwardly to an inoperative position by the aligned engaging spacer bars 84 above described.

By this same construction, when the corresponding pair of dogs 72 at any empty station have been tipped to the upright position shown as at A, FIG. 3, all of the normally inoperative positioned dogs rearwardly thereof will, also, be tipped upwardly, by these same spacer bars.

In addition to the second cam roller 78 on the rear most of the sets of pivotal dogs 72, it is contemplated that there may be one or more additional such dogs intermediate the ends of the row of said pairs of dogs which will also have a second cam roller 78 to, thus, divide the load, tipping the dogs forwardly thereof to inoperative position. Otherwise, the load for tipping all of the said forwardly arranged dogs would, otherwise be on the last-most dog and its second cam roller 78.

It is noted that the work piece detecting lever 92 has a first normal upright position as shown in FIG. 3 when no work piece W is in the respective work piece station, 24. Said work piece detecting lever has a second position which is inclined, also shown in FIG. 3 when a work piece W is in the corresponding station and engageable therewith. In this second position of the work piece detecting lever, the lower end thereof has been tilted upwardly, FIG. 3, so that it is no longer in operative retaining engagement with the dog actuator 104 as it is when the detecting lever is in the upright position shown.

Thus, the dog actuator lever 104 shown in normal horizontal dog actuating position, FIG. 3, is movable to the second angled inclined inoperative position shown, either moving to that position automatically by gravity or loosely eased into that position by the first dog roller 76 during retraction movement as it engages the said cam surface 110.

It is noted, however, that in the inclined position shown in FIG. 3, cam surface 110, is thus, out of the path of rearward movement of the corresponding dog roller 76, with the result that the dog will remain in the inoperative position designated at B.

As best shown in FIGS. 2 and 4, adjacent one of the side plates 96, FIG. 2, there is provided an elongated work guide rail 120 spaced outwardly of side rail 22 by spacer 122, providing an elongated channel, adapted to receive the radially enlarged portion of work piece W. Thus, guide rail 120 is adapted to restrain the work pieces against relative transverse movements with respect to work receiving stations 24–26.

The spacer bars 84, of which there are a pair, corresponding to adjacent to and connected to a corresponding pair of work lifting dogs 72, are of a length equal to the spacing between stations with approximately one-half of the spacer bar extending forwardly of the pair of work lifting dogs and the other portion extending rearwardly thereof.

I claim:

1. An automatic accumulating work piece transfer machine comprising a frame having a plurality of longitudinally spaced work piece receiving stations thereon;
   a shuttle mounted on said frame;
   means mounted on said frame and attached to said shuttle for reciprocal alternating vertical and horizontal movements;
   a pair of parallel opposed longitudinal rows of lifting dogs pivotally mounted on said shuttle for lifting a work piece off of each of said work piece receiving stations and carrying the same to the next forward station;
   each of said lifting dogs in a first longitudinal row having a first cam roller mounted on the lower outside end thereof;
   a second cam roller mounted on the outside upper middle of some of said lifting dogs in the second longitudinal row;
   a tie rod interconnecting opposed dogs in said rows for tilting in unison;
   a plurality of work piece detecting levers corresponding to each station pivotally mounted on said frame adjacent said first row of dogs, each having a projection on its upper end whose upper surface extends into the space of said work piece receiving station and a flat lower surface on its lower end;
   said lower surface being in a normal position;
   a dog actuating lever pivotally mounted on said frame underneath each of said work piece detecting levers having a cam surface contractable by said first roller on said lifting dog near the end of horizontal retraction of the shuttle for tilting said lifting dog to operative position, said dog actuating lever being normally in a horizontal position;
   means on said frame engageable with said second cam roller for simultaneously pivoting said lifting dogs from a first operative upright position wherein said lifting dogs will engage and lift a work piece when the shuttle is lifted, to a second angled over, normally inoperative position wherein, the lifting dogs will not engage a work piece when said shuttle is lifted;
   said work piece detecting lever being pivotal from a first normal upright position when no work piece is in the respective work station, to a second position when a work piece is in said station engagable therewith, said second position being one which permits said dog actuator lever to pivot on its axis;
   said dog actuator lever being pivotal from a first horizontal position to a second angled inoperative position, said dog actuator lever in said first position having a surface in contact with and retainingly engaged by said detecting lever, and in said second position, having its cam surface being non-engageable by said first roller on said lifting dog on retraction of said shuttle.

2. The transfer machine of claim 1, in which said means for simultaneously tilting said work piece lifting dogs from said operative position to said inoperative position is
   an interference stop on said frame engagable with said second cam roller near the beginning of the horizontal retraction of said shuttle for tilting said one lifting dog to inoperative position; and movable means on said shuttle interengaging all of said lifting dogs forward of said one lifting dog, whereby, when said one lifting dog is cammed over, the balance of said lifting dogs forward of said one lifting dog are also tilted to inoperative position.

3. In the transfer machine of claim 2, said movable means being so arranged on said shuttle that for any empty station when the opposed pair of lifting dogs have been cammed to operative position, all pairs of said lifting dogs rearwardly thereof are also tilted to operative position, so that all work pieces in filled stations on the next forward stroke of the shuttle are simultaneously advanced one station.

4. In the transfer machine of claim 1, said shuttle including a pair of spaced longitudinally extending interconnected upright transfer bars;

the pivotal mounting of opposed pairs of dogs including a transverse pivot shaft journalled through said transfer bars and on its ends, mounting said dogs;

said tie rods interconnecting said opposed pair of dogs being spaced above said transfer bars, limiting the pivotal movements of said dogs.

5. In the transfer machine of claim 1, movable means on said shuttle engaging all of said lifting dogs whereby, when one lifting dog is cammed to operative position, all pairs of lifting dogs rearwardly thereof are also tilted to operative position, so that all work pieces in filled stations on the next forward stroke of the shuttle are simultaneously advanced one station.

6. In the transfer machine of claim 5, said movable means including a pair of spaced rows of aligned spacer bars arranged end to end slidably mounted on said shuttle, with each spacer bar in each row corresponding to each dog loosely connected to said tie rods respectively, so that the pair of spacer bars corresponding to each opposed pair of lifting dogs move in unison.

7. In the transfer machine of claim 6, a channel guide means upon the rear end of each spacer bar except the last spacer bar extending rearwardly thereof, cooperatively and guidably receiving the forward end of the adjacent spacer bar.

8. In the transfer machine of claim 1, a pair of opposed said rails upon said frame at and along the top thereof;

said stations including longitudinally spaced opposed pairs of blocks on said rails with depressions on the top of each block by which an elongated work piece intermediate its ends is nested into and retained by said pairs of blocks.

9. In the transfer machine of claim 8, an elongated end thrust upright plate on said frame outwardly of one of said side rails defining a channel to receive enlarged end portions of said work pieces and to retain them against relative transverse movements.

10. In the transfer machine of claim 1, the means to move said shuttle including power operated cylinder assemblies to sequentially move the shuttle upwardly, forwardly, downwardly and rearwardly in a continuous manner and in a general clockwise direction.

11. In the transfer machine of claim 2, and a downwardly and rearwardly curved guide cam pivoted on said frame forwardly of said interference stop, receiving said second cam roller therebetween smoothly guiding said one dog to its inoperative position.

12. In the transfer machine of claim 1, the shuttle moving means, including a pair of horizontally disposed lifting members upon the under surface of the shuttle adjacent its opposite ends;

each lifting member having an elongated horizontally disposed slot;

a pair of longitudinally spaced lift arms at their lower ends pivoted upon said frame;

a pair of spaced clevices at the upper end of each lift arm, each clevice mounting a roller guidably positioned in said cam slots respectively;

a power cylinder assembly pivotally mounted upon said frame and connected to said lift arms for actuating the same forwardly and rearwardly to raise and lower said shuttle;

and a second power cylinder assembly pivotally mounted upon said frame and connected to said shuttle for effecting horizontal reciprocal movements thereof.

* * * * *